FIG 1
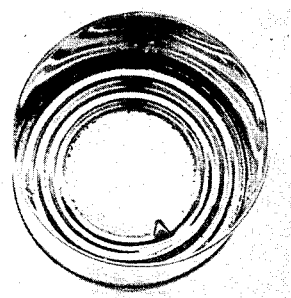
FIG 3
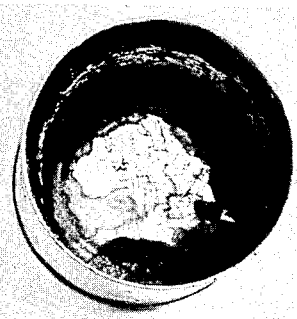
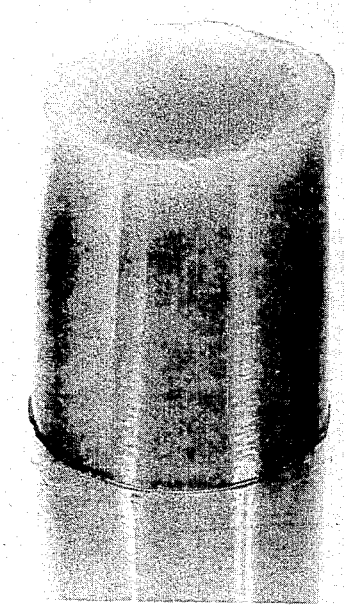
FIG 2
FIG 4

United States Patent Office 3,692,541
Patented Sept. 19, 1972

3,692,541
CANNED APPLE GEL AND METHOD OF PREPARING SAME
Vincent F. Altieri, Duxbury, and James E. Tillotson, Cohasset, Mass., assignors to Ocean Spray Cranberries, Inc., Hanson, Mass.
Filed July 6, 1970, Ser. No. 52,432
Int. Cl. A23l 1/04
U.S. Cl. 99—132
4 Claims

ABSTRACT OF THE DISCLOSURE

A canned apple gel having a solids content of 30–60% and containing a non-gelling gum as a can release agent to permit the contents of the can to be easily removed as an unbroken unit.

---

This invention relates to the preparation of an apple food product for market and more particularly to a unique apple gel packaged for marketing in conventional tin cans without resort to glass or other more expensive containers.

Applesauce is often served in restaurants and homes as part of a pork or sausage entrée course, just as cranberry sauce has become a popular serving with turkey and chicken.

Apple in conventional applesauce form has had such long acceptance as such as entreée serving that persons are oblivious to its shortcomings, namely, that unlike jellied cranberry sauce, applesauce cannot be served in the form of slices or other self-sustaining shapes cut from a can molded unit.

It is a primary object of this invention to provide an apple product that can be handled for serving more nearly like jellied cranberry sauce in that it will have not only a solid form but also a different texture and mouth feel than applesauce, making it acceptable as a salad ingredient, for example.

Attempts to gel apple mixes in a sealed tin can have consistently resulted in producing a molded unit within the can which sticks to the walls of the can, no matter whether the can has an enamel lining or not. The contents does not come out intact but breaks up, with some of the contents sticking as residue to the walls. The product has poor can release.

The present invention provides an apple mix which has good can release, even with its relatively low apple solids content, i.e., in the range of only about 30% by weight.

In accordance with the invention, an apple sweetened mix is gelled with the use of low-methoxy pectin and a conventional activator therefor, in the presence of a small amount of a non-gelling gum. Surprisingly, a small amount of non-gelling gum, i.e. in the range of .01–.05% by weight results in the gum performing as a can release agent preventing the gelled unit from sticking to ordinary tin can walls.

As a result the apple gel residing in the can may be handled for serving just like jellied cranberry sauce. The end of the can may be removed, the can inverted and the gelled contents shaken from the can as an integral unit onto a plate where it will stand in end-wise upright self-sustaining position without sagging. It can then be served sliced if desired.

It appears that the incompatibility of gelled apple mix with tin can packaging so far as can release is concerned may be unique. Other low-methoxy fruit gels do not appear to be subject to this sticking problem in tin cans and neither they nor the apple gels encounter this problem if packaged in glass jars.

A typical formulation is accordance with this invention is as follows:

| | Lbs. |
|---|---|
| Whole apples | 30 |
| Sucrose-granulated (sweetener) | 19.5 |
| Gelling agent: | |
|   Low-methoxy pectin | 1.2 |
|   Gum-xanthan | 0.05 |
|   Apple concentrate (74.9° Brix) and apple essence | 2.475 |
| Activator: | |
|   $CaCl_2 \cdot H_2O$ | .22 |
|   Citric acid | .5 |
|   Coloring—artificial | .055 |
|   Water | 46 |
| | 100.000 |

The apple product may be prepared by comminuting the apples, cooking until the pulp is separated from the skin, passing the cooked mix through a screen to form a puree; adding the low-methoxy pectin, the apple concentrate, the sugar and the citric acid as a hot pre-mix, and bringing the cook from about 140° F. up to almost 200° F. preferably in a matter of about 7 minutes.

When up to temperature, the remaining ingredients are added with the last quantity of water, and cooking is continued for about 3 minutes until the temperature reaches 205 to 208°.

The mix is then filled into cans at a temperature which is not below 195° F. The cans are then placed in cooling water at 50° F. temperature, the cans being kept upright and not disturbed during cooling until the temperature at the centers of the cans comes down to 123° F. Thereafter the cans are removed from the water tank.

Good can release in the case of the apple products has also been secured with the use of other gums, as defined in Chapter 8 of "Handbook of Food Additives" (The Chemical Rubber Company, Cleveland, Ohio), such as guar, agar, arabic, locust bean, tragacanth, karaya, carboxymethylcellulose.

The sweetener may also be an invert syrup or a blend of either sucrose or invert syrup with corn syrup, dextrose or saccharin.

As the apple solids content goes above 60%, the product changes in mouth feel and becomes more and more pasty. As the gum content goes above 0.05% sticking to the can walls starts to occur again and at a 0.2% level and higher, the product completely loses its gel strength and takes on a salvy mouth feel.

The preferred formulation, however, slides out of the can with its exterior surface having a glossy sheen, i.e., extremely shiny as shown in FIG. 2 leaving the tin can from which it has been removed completely empty as shown in FIG. 1. The product will slice clean with a knife and the slices have a matte surface and a granulation similar to that of a natural apple slice. It has a chewy mouth feel—not salvy or gummy. As such, the product is susceptible to many manners of use which are not feasible with applesauce.

Omission of the xanthan gum from the above formulation without other change in formulation or processing produced the can-sticking results with deposited residue indicated in FIGS. 3 and 4.

What is claimed is:
1. The method of preparing an apple food product for market comprising heating a sweetened apple mix having an apple solids content of 30–60% by weight, sealing the hot mix at above about 195° F. in a tin can in the presence of sufficient low-methoxy pectin and a calcium salt activator therefor to cause the mix to form into a gelled unit as it cools in said can to about 123°

F. at the center and including in said mix as a can release agent a non-gelling gum in an amount from .01 to .05% by weight to permit the contentes of the can to be easily removed as a single unbroken unit from the can, when an end of the can is removed and the can is inverted, without portions of the unit sticking, unremoved, to the can wall.

2. The method as claimed in claim 1 wherein the release agent is xanthan gum.

3. A canned apple gel having an apple solids content of from 30 to 60% by weight, and containing low-methoxy pectin as its gelling agent and a non-gelling gum in an amount from .01–.05% of the total weight of the gel as a can release agent for preventing sticking of said gel to the can wall.

4. A canned apple gel as claimed in claim 3 having an apple solids content of about 30% by weight and having, upon removal from the can as a unit, a smooth, shiny external surface and a granulated internal texture and a matte surface when sliced.

References Cited
UNITED STATES PATENTS

| | | | |
|---|---|---|---|
| 2,334,281 | 11/1943 | Olsen et al. | 99—132 |
| 3,367,784 | 2/1968 | Waitman et al. | 99—132 |
| 2,992,925 | 7/1961 | Green et al. | 99—131 |
| 2,701,767 | 2/1955 | Twieg et al. | 99—132 |
| 2,910,365 | 10/1959 | Histon | 99—132 |

RAYMOND N. JONES, Primary Examiner

J. M. HUNTER, Assistant Examiner

U.S. Cl. X.R.

99—186